United States Patent
Labeye et al.

(10) Patent No.: US 6,212,307 B1
(45) Date of Patent: *Apr. 3, 2001

(54) INTEGRATED OPTICAL FILTER

(75) Inventors: Pierre Labeye, Grenoble; Patrick Pouteau, Voreppe, both of (FR)

(73) Assignee: Commissariat a l'Energie Atomique, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/839,798

(22) Filed: Apr. 18, 1997

(30) Foreign Application Priority Data

May 10, 1996 (FR) .................................. 96 05840

(51) Int. Cl.[7] ..................................... G02B 6/10
(52) U.S. Cl. .......................... 385/14; 385/129; 385/130; 385/132
(58) Field of Search ............................. 385/14, 129, 130, 385/132

(56) References Cited

U.S. PATENT DOCUMENTS

| | | | |
|---|---|---|---|
| 4,740,951 | * | 4/1988 | Lizet et al. ................... 370/3 |
| 4,773,063 | * | 9/1988 | Hunsperger et al. ........... 385/14 |
| 4,781,424 | * | 11/1988 | Kawachi et al. ............... 385/132 |
| 4,865,453 | * | 9/1989 | Gidon et al. .................. 356/358 |
| 5,177,804 | * | 1/1993 | Shimizu et al. ................ 385/20 |
| 5,182,787 | * | 1/1993 | Blonder et al. ................ 385/131 |
| 5,263,111 | * | 11/1993 | Nurse et al. .................. 385/47 |
| 5,321,779 | | 6/1994 | Kissa ........................... 385/14 |
| 5,473,721 | * | 12/1995 | Myers et al. .................. 385/129 |
| 5,664,032 | * | 9/1997 | Bischel et al. ................. 385/4 |
| 5,710,854 | * | 1/1998 | Myers et al. .................. 385/132 |
| 5,742,045 | * | 4/1998 | Parker et al. .................. 250/214 A |
| 5,940,548 | * | 8/1999 | Yamada et al. ................ 385/14 |

FOREIGN PATENT DOCUMENTS

| | | | |
|---|---|---|---|
| 0 397 337 | | 11/1990 | (EP) . |
| 2 659 148 | | 9/1991 | (FR) . |
| 2 223 860 | | 4/1990 | (GB) . |
| 0144608 | * | 7/1986 | (JP) ........................... 385/14 |
| 0269129 | * | 11/1988 | (JP) ........................... 385/14 |
| WO 95/34010 | | 12/1995 | (WO) . |

OTHER PUBLICATIONS

Patent Abstracts of Japan, vol. 14, No. 274 (P–1061), Jun. 13, 1990, JP–02–081005, Mar. 22, 1990.

* cited by examiner

*Primary Examiner*—Rodney Bovernick
*Assistant Examiner*—Ellen E. Kim
(74) *Attorney, Agent, or Firm*—Oblon, Spivak, McClelland, Maier & Neustadt, P.C.

(57) ABSTRACT

The invention relates to an integrated optical device having an optical microguide (44) of index $n_0$ between two media of respective refractive indices $n_1$ and $n'_1$, such that $n_1 < n_0$ and $n'_1 > n_0$, and filtering means (46, 48) constituted by at least one reflector element placed on at least one side of the microguide, the reflector elements having at least one element etched in layers of index $n_1$ and/or $n'_1$ and/or $n_0$.

13 Claims, 4 Drawing Sheets

INTEGRATED OPTICAL FILTER

TECHNICAL FIELD AND PRIOR ART

The invention relates to an integrated optical stray light filtering device.

The invention applies to any integrated optical device, particularly in the field of optical microsystems, e.g. for telecommunications, or in the field of integrated optical microsensors.

Such a device incorporates an optical microguide, which is defined by a core known as the microguide core between two media, whose respective refractive indices are lower than the refractive index of the microguide core.

Thus, by definition, such a guide structure results from the superimposing of three media, the intermediate medium (the core) having a refractive index higher than that of the two other media. A microguide is a particular guide structure, whereof at least one of the three media constituting the guide structure is laterally limited (e.g. by etching) in order to ensure a lateral light confinement.

An integrated optical device incorporating a microguide is diagrammatically shown in plan view in FIG. 1. The device is designated overall by the reference 2 and has a microguide 4 extended by two microguides 6 and 8. The illustrated device also has an input connection 10 and output connections 12, 14.

The input connection can be connected to one or more light sources optionally incorporating focussing means or, as shown in FIG. 1, an optical fibre 16 permitting the formation of a flexible link between a light source and the device 2. At the output, the light can be coupled to optical fibres 18, 20 or to detectors, i.e. in general terms to light collection means. The connection between the sources or fibres, or the collection means takes place by positioning these various elements in front of input or output microguides. Different methods have been produced for obtaining such connections, one being described in FR-A-2 659 148.

However, the alignment always takes place with a certain tolerance, which is consequently not perfect. Thus, particularly at the input of the integrated optical device, there is always a slight light loss. This is represented in FIG. 1, where the rays or beams 22, 24 represent the stray light escaping from the input fibre 16 in the integrated structure 2. This stray light is in most cases confined in the guide structure and propagates therein. It generally undergoes reflections and will interfere with the useful signals sampled by the collection means (fibres 18 and 20 in FIG. 1) at the output of the microguides 6, 8. This effect is far from being negligible and is greater in integrated optics than in conventional optics, because the light there is wholly or partly confined in the plane of the guide structure of the device. At present no method exists making it possible to obtain freedom from said stray light, so that there is a deterioration to the operating quality of the device, particularly in terms of signal-to-noise ratio in the case of integrated optical sensors.

DESCRIPTION OF THE INVENTION

The invention relates to an integrated optical device having an optical microguide of index $n_0$ between two layers of respective refractive indices $n_1$ and $n'_1$ such that $n_1 < n_0$ and $n'_1 < n_0$, and filtering means constituted by at least one reflector element placed on at least one side of the microguide, the reflector elements having at least one element etched in the layers of index $n_1$ and/or $n'_1$ and/or $n_0$.

These filtering means are able to filter by reflection the stray light propagating in the device in the vicinity of the microguide.

More specifically, the layers of indices $n_1$ and $n'_1$ in each case define a plane on either side of the microguide. The filtering means etched in the layers of indices $n_1$ and/or $n'_1$ and/or $n_0$ permit the filtration of the stray light propagating "horizontally", i.e. in the plane of the microguide and/or layers of indices $n_1$ and $n'_1$.

The reflector elements are produced in the media of refractive index $n_1$ and/or $n'_1$ and/or $n_0$ and can consequently be produced during the production of the integrated optical structure. In addition, such reflector elements can advantageously be placed in the vicinity of output connections of the integrated optical device, so as to reflect light liable to interfere with possible light recovery or collection means. However, such elements can also be placed at the input of the device or at any other location requiring stray light filtering.

Reflector elements can be placed on either side of the microguide, thus ensuring a filtering of the light of the two sides of the microguide.

One face of the reflector element or elements can be covered with a reflecting layer, made from a material incorporating gold, chromium, aluminium, platinum, silver, copper or a dielectric material.

In order to improve the filtering efficiency, the device can incorporate at least two reflector elements arranged in succession, e.g. in a direction parallel to the optical microguide of index $n_0$.

The reflector element or elements can be oriented perpendicular Cc) the microguide direction and can also be inclined with respect to the microguide axis.

In particular, when the device also has an element for collecting the light carried by the microguide, said collection element having an acceptance angle $\alpha_C$, the reflector element can advantageously be inclined with respect to the microguide axis by an angle $$\beta < \frac{\pi}{2} - \alpha_c - \arcsin\left(\frac{n_3}{n_2}\right),$$

where $n_3$ is the index of the medium forming the reflector and $n_2$ the effective index of the structure surrounding the microguide, where the reflector is produced.

According to an embodiment, the reflector element contains air of index 1.

If the collection element is an optical fibre with a core of index $n_4$ and a cladding of index $n_5$, we obtain:

$$\alpha_c = \arcsin\left(\sqrt{n_4^2 - n_5^2}\right).$$

BRIEF DESCRIPTION OF THE DRAWINGS

The features and advantages of the invention will become clearer in the light of the following description of non-limitative embodiments and with reference to the attached drawings, wherein show.

DETAILED DESCRIPTION OF EMBODIMENTS OF THE INVENTION

Figure 2:
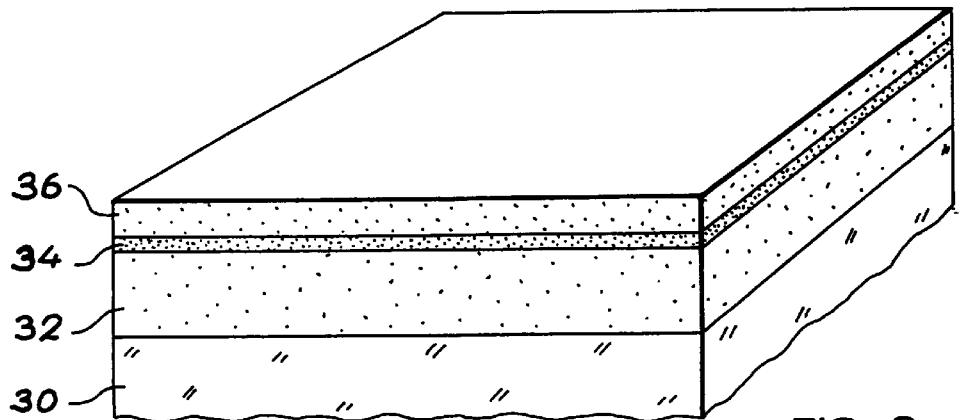
FIG. 2A multilayer structure permitting the obtaining of an integrated structure usable in a device according to the invention.

An integrated optical device according to the invention has an integrated optical guide structure formed from a structure illustrated in FIG. 2. The latter comprises a substrate 30, e.g. of silicon, a first confinement layer 32, e.g. of silica $SiO_2$ of index 1.45, a guide layer 34, e.g. of $Si_3N_4$ of index 1.99 and a second confinement layer 36, e.g. of $SiO_2$ of index 1.47 (said indices being given for $\lambda=0.78$ $\mu$m). The thickness of the first and third layers can e.g. be respectively approximately 2 and 1 $\mu$m. In general terms, their thickness is between 1 $\mu$m (or a few $\mu$m, e.g. 2, 3 or 5 $\mu$m) and several $\mu$m (or a few dozen $\mu$m, e.g. 10, 20, 30 or 50 $\mu$m). The thickness of the intermediate layer is e.g. between 100 and 200 nm, e.g. 165 nm.

The device according to the invention can be produced on any random integrated optical structure. In particular, it can be produced in glass, lithium niobate, semiconductor multilayer structures such as III-V or II-VI structures. For example, use can be made of one of the following structures:

glass/glass doped by ion exchange/$SiO_2$, $LiNbO_3$/$LiNbO_3$ doped by titanium diffusion/$LiNbO_3$, in these first two cases the first confinement layer or buffer layer coincides with the substrate, Si/$SiO_2$/$Si_3N_4$/$SiO_2$, Si/$SiO_2$/$SiO_xN_y$/$SiO_2$ with $0 \leq x \leq 2$ and $0 \leq y \leq 4$, Si/$SiO_2$/doped $SiO_2$/$SiO_2$, the dopants of the guide layer being such that the latter has a higher refractive index than that of the adjacent layers, e.g. phosphorus, germanium, titanium or nitrogen.

It is also possible to replace the $Si_3N_4$ guide layer by alumina and/or to dope the silica used as the buffer layer and as the upper layer of the guide structure by a dopant decreasing the refractive index of the silica such as fluorine or by a dopant increasing the refractive index of the silica. Obviously, the guide layer must always have a refractive index higher than that of the buffer layer and that of the associated upper layer.

On a guide structure like that of FIG. 2 is produced a microguide, e.g. by total or partial etching of the upper confinement layer 36 or guide layer 34, using conventional procedures, e.g. photolithography by masking.

Figure 3A:
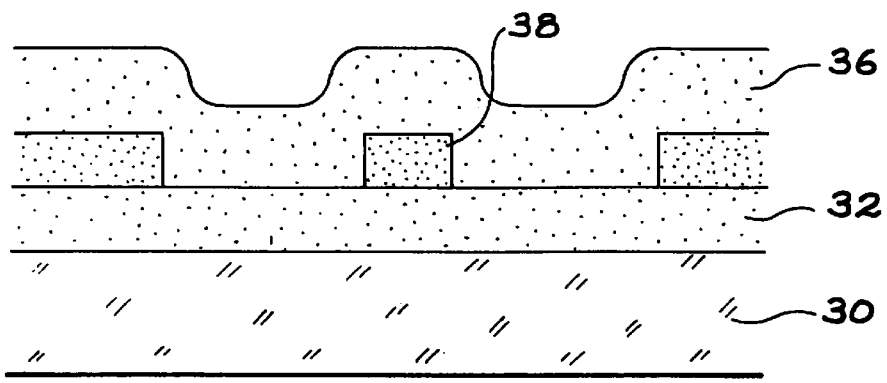
FIGS. 3A and 3B In section examples of guide structures.

A structure obtained by etching the guide layer is diagrammatically shown in section in FIG. 3A, where it is possible to see the substrate layer 30 and first confinement layer 32 (e.g. respectively of silicon and 3% phosphorus-doped silica). The guide layer 34 has been etched so as to free a microguide 38, whose axis extends perpendicular to the plane of FIG. 3A. The microguide 38 is e.g. of 6% phosphorus-doped silica. The upper confinement layer 36 is e.g. of 3% phosphorus-doped silica. The index $n_0$ of the microguide 38 exceeds the indices $n_1$ and $n'_1$ of the layers 32 and 36 and consequently any radiation introduced into said microguide propagates along the axis of the latter.

Figure 3B:
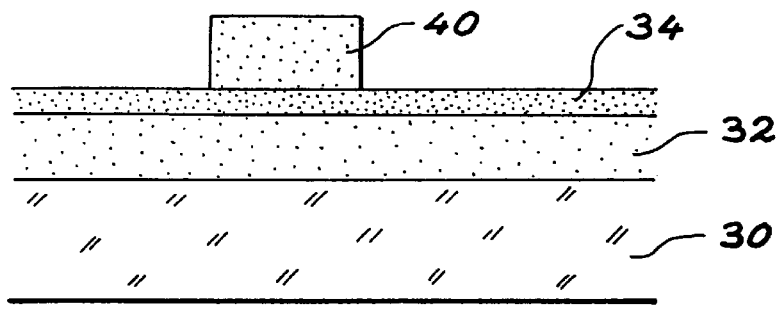

A structure obtained by etching the upper confinement layer is illustrated in FIG. 3B, where it is possible to see the substrate 30 (e.g. of silicon), the first confinement layer 32 (e.g. of $SiO_2$), and the guide layer 34 (e.g. of $Si_3N_4$). A layer 40 (e.g. of $SiO_2$) is obtained by etching the upper confinement layer 36. The signal is located in the microguide defined by that part of the guide layer 34 positioned below the confinement area 40.

A process for producing one of the structures described hereinbefore uses conventional layer deposition methods. Reference can be made in this connection to plasma assisted chemical vapour deposition or PECVD, particularly in the case of silica layers, or other chemical vapour deposition processes such as flame hydrolysis and low pressure chemical vapour deposition (LPCVD), particularly in the case of silicon nitride $Si_3N_4$ layers.

Moreover, when the said layers have the same base constituent, e.g. silica, in order to obtain a refractive index difference, a doping takes place of one, some or all the layers using known methods. Reference among the latter can be made to the use of chemical reactions in the presence of reactive gases, ion implantation and the diffusion of miscellaneous atoms or ions.

In a structure of the type described hereinbefore, light propagation takes place at a certain effective speed $V_e$. The effective index $n_e$ of the structure is defined by:

$$n_e = \frac{C}{V_e}$$

in which C is the speed of a plane wave in space.

In the case of the structures described hereinbefore, having a guide layer of index $n_0$ between two layers of index $n_1$ and $n'_1$ (the latter assumed to be very thick compared with the layer of index $n_0$), the equation making it possible to find $n_e$ is:

$$\frac{2\pi d}{\lambda}\sqrt{n_0^2 - n_e^2} - \text{Arctan}\frac{\sqrt{n_e^2 - n_1^2}}{\sqrt{n_0^2 - n_e^2}} - \text{Arctan}\frac{\sqrt{n_e^2 - n_1'^2}}{\sqrt{n_0^2 - n_e^2}} = m\pi$$

in which $\lambda$ is the wavelength of light, d the thickness of the layer of index $n_0$ and m an integer. Generally, in integrated optical guides, this equation is such that it only allows a single solution for $m=0$. The parameter obtained $n_e$ is a type of mean index of the three layers, seen by the light propagating in the plane.

A light beam, particularly a stray beam, propagating in said structure of index $n_e$ and arriving at an interface with a medium of index $n'_e$ will be totally reflected at said interface when the angle defined between the direction of the beam and the perpendicular to the reflection plane of the reflector exceeds $$\alpha_0 = \text{Arcsin}\left(\frac{n'_e}{n_e}\right).$$

Figure 1:
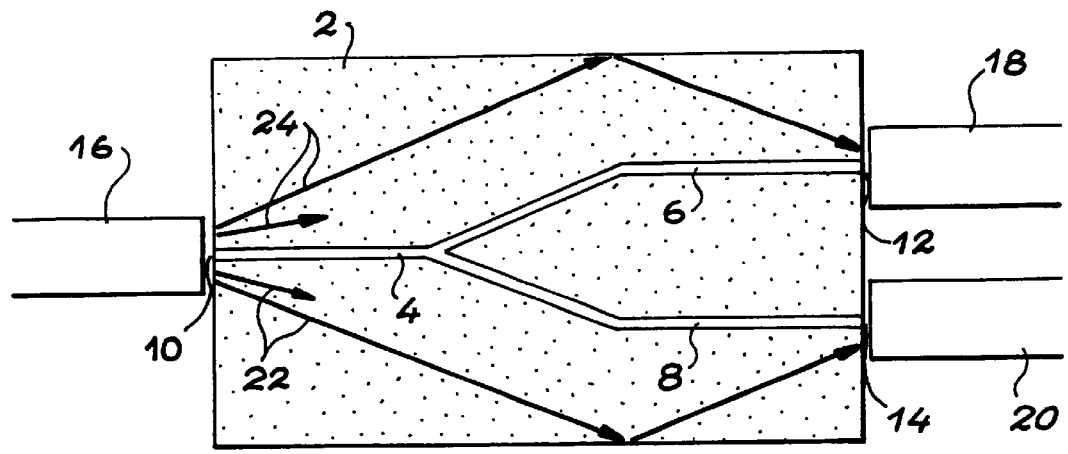
FIG. 1 (Already described) diagrammatically and in plan view a guide structure of a prior art device.

A device of the type described in conjunction with FIG. 1 has output fibres 18, 20 constituted by a core of index $n_4$ surrounded by a cladding structure of index $n_5$. Thus, such an optical fibre has a numerical aperture of acceptance cone of semiangle $$\alpha_C = \text{Arcsin}\left(\sqrt{n_4^2 - n_5^2}\right).$$

No beam incident on the input face of the optical fibre with an angle of incidence exceeding $\alpha_C$ (semiangle at the apex of the acceptance cone) is guided in the fibre.

Figure 4:
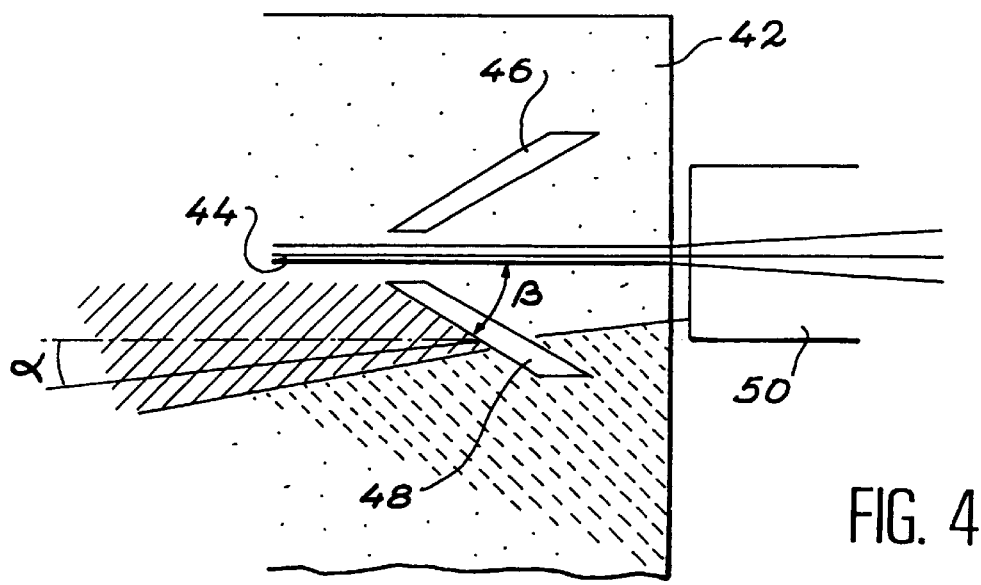
FIG. 4 An embodiment of the invention.

In an integrated optical device 42 having a microguide 44, the invention consequently proposes in the manner illustrated in FIG. 4, the production of one or more reflectors 46, 48 of index $n_2$ having an interface forming an angle $\beta$ with the axis of the microguide such that:

$$\beta < \frac{\pi}{2} - \alpha_C - \text{Arcsin}\left(\frac{n_2}{n_e}\right)$$

in which $n_e$ is the effective index of the structure surrounding the microguide.

Thus, any beam arriving with an angle $\alpha$ below $$\frac{\pi}{2} - \beta - \text{Arcsin}\left(\frac{n_2}{n_e}\right)$$

will be totally reflected by the filtering elements 46, 48. Any beam arriving with a greater angle $\alpha$ will be transmitted by the reflector, but could be trapped by the output fibre 50, because said beam will be outside its acceptance angle (the angle $\alpha$ exceeding the numerical aperture of the fibre). The angle $\alpha$ is defined by the angle between the direction of the beam and the optical axis of the microguide (cf. FIG. 4).

In the diagram of FIG. 4, two filtering elements 46, 48 are shown on either side of the microguide 44. Certain applications may only require a single filtering element operating on the same principle. Two symmetrically positioned filtering elements make it possible to filter light symmetrically on either side of the guide.

Figure 5:
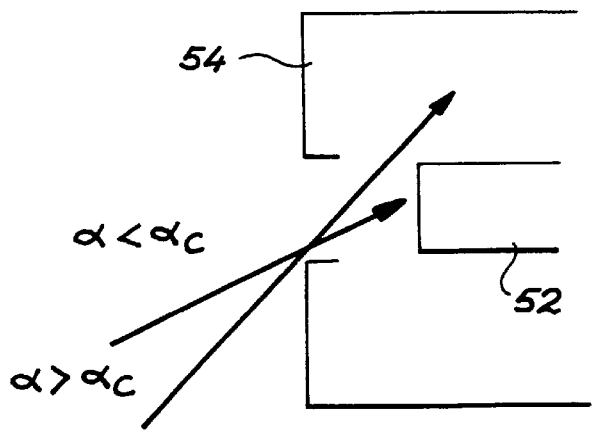
FIG. 5 The notion of an acceptance cone for a detector.

In general terms, any optical device or detector has an acceptance angle $\alpha_C$. FIG. 5 shows a detector 52 in a case 54. It can be clearly seen that there is an angle $\alpha$ such that: an incident beam having an angle $\alpha^C$ strictly exceeding $\alpha_C$ is not trapped by the detector 52, an incident beam having an angle $\alpha$ below $\alpha_C$ is trapped by the detector 52.

In general terms, no matter what the optical device under consideration, there is an acceptance angle defined by the geometry of the arrangement in which said device is incorporated.

Therefore, if the optical fibre 50 of FIG. 4 is replaced by a random optical device having an acceptance angle $\alpha_C$, the filtering means 46, 48 will be positioned so as to have an interface forming an angle $\beta$ with the microguide axis, such that:

$$\beta < \frac{\pi}{2} - \alpha_c - \text{Arcsin}\left(\frac{n_2}{n_e}\right)$$

in which $n_2$ and $n_e$ have the meanings given hereinbefore. Under these conditions, no stray beam, arriving in incidence on one of the filtering elements 46, 48 with an angle exceeding $$\frac{\pi}{2} - \beta - \text{Arcsin}\left(\frac{n_2}{n_e}\right)$$

will be transmitted, but will not reenter the optical device located at the output, whereas any stray beam arriving with an angle below $$\frac{\pi}{2} - \beta - \text{Arcsin}\left(\frac{n_2}{n_e}\right)$$

will be totally reflected by the filtering elements 46, 48.

Figure 6:
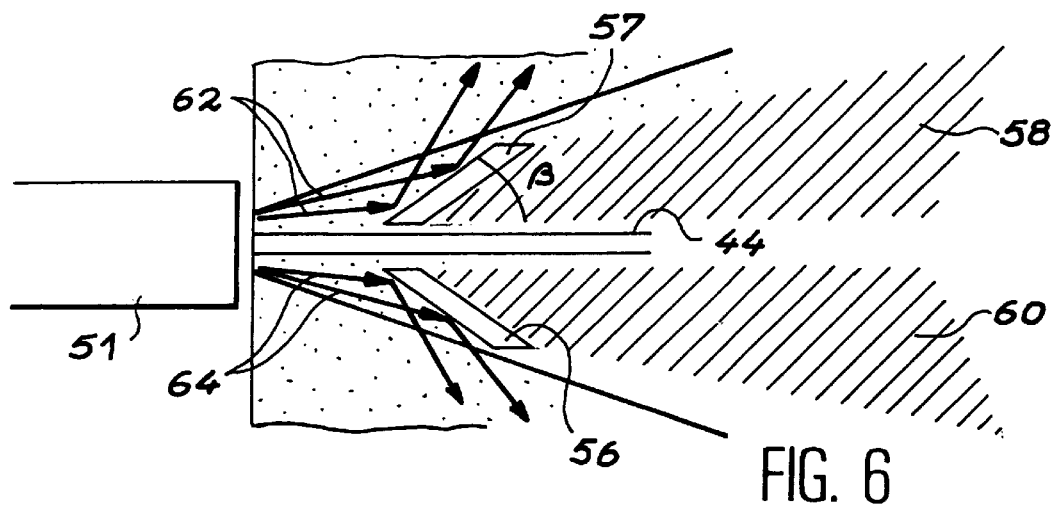
FIG. 6 A variant of the first embodiment of the invention.

The invention has been described with reflectors located in the vicinity of an output of the integrated optical structure. As illustrated in FIG. 6, reflectors 56, 57 can also be placed at the input of a microguide 44, e.g. positioned facing an input optical fibre 51. In this case, the reflectors define stray light-free areas 58, 60. Thus, as the beams 62, 64 propagate longitudinally, on either side of the microguide 44 reflection takes place at the interface with the filtering elements 56, 57. It is possible to define an emittance angle $\alpha_C$, or semiangle at the apex of the emittance cone (cone in which the optical fibre 51 emits radiation). The angle of inclination $\beta$ of the interface with respect to the microguide axis is preferably chosen so that $$\beta < \frac{\pi}{2} + \alpha_c - \text{Arcsin}\left(\frac{n_2}{n_e}\right).$$

This variant can apply no matter what optical device is located at the input of the microguide 44, i.e. optical fibre, radiation source, etc., it being possible to define an emittance cone with semiangle $\alpha_C$ at the apex.

The filtering means described in the first embodiment of the invention make it possible to totally reflect the stray light, whose beams form a small angle with the axis of the microguide about which they are positioned and which are the most likely to interfere with the useful signal. They consequently largely improve the optical operation of the device. More particularly, in the case of a sensor, they make it possible to significantly improve the signal-to-noise ratio and therefore lead to a more precise and sensitive sensor.

Figure 7A:
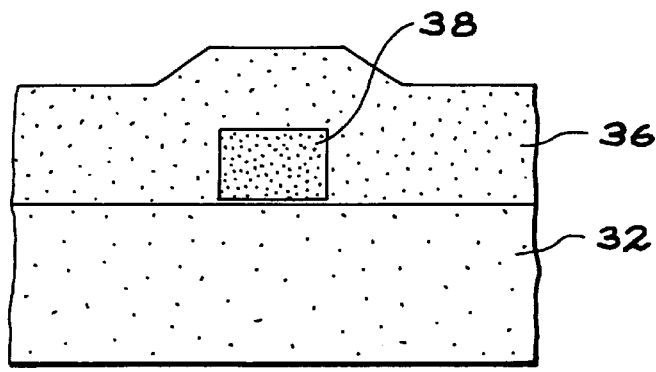
FIGS. 7A and 7B An example of a device according to the first embodiment of the invention.
Figure 7B:
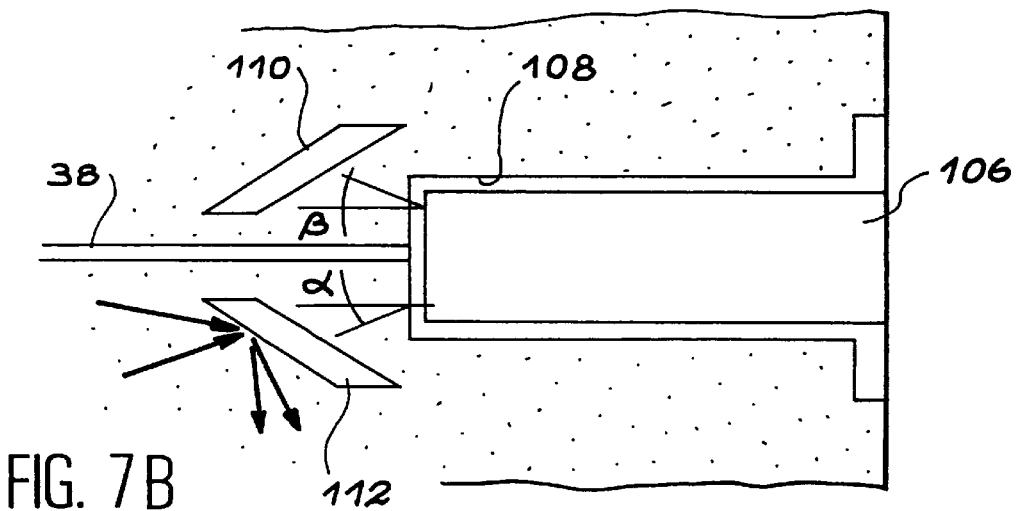

An embodiment of a device incorporating filtering elements according to the first embodiment of the invention will now be described in conjunction with FIGS. 7A and 7B. FIG. 7A shows in section the structure of the microguide 38 and its lower and upper guide layers 32, 36. These three layers are of phosphorus-doped silica, the two guide layers 32, 36 having an index of approximately 1.47, whereas the microguide 38 has an index of approximately 1.48. The layer 32 has a thickness $h_1$ exceeding 8 $\mu$m, the layer 36 a thickness $h_2$ exceeding 6 $\mu$m, and the microguide 38 has a height $h_3$ of approximately 2 $\mu$m for a width 13 of 2.5 $\mu$m. The height of the optical structure is consequently approximately 15 $\mu$m. Such a structure has an effective index $n_e$ of roughly 1.4755.

The output coupling of the optical guide structure can be effected by multimode optical fibres. It is then possible to bring about a good coupling by using the method proposed in FR-A-2 659 148 consisting of completely etching the optical structure and then isotropically etching the silicon in order to create positioning holes for the optical fibres. FIG. 7B is a plan view of the output coupling area of the microguide 38. An optical fibre 106 is positioned in a positioning hole 108 etched in the silicon. Reflectors 110, 112 are located on either side of the microguide 38 with a direction according to the teaching of the invention. The reflectors can be produced at the same time as the connection hole 108, by simply etching in the optical structure rectangles on either side of the output microguide 38. After etching the reflectors can be left hollow and then have an index of 1. The output fibre is of doped silica and has a core index $n_4$ of 1.46 and a cladding index $n_5$ of 1.45. Its numerical aperture is then:

$$\alpha_c = \text{Arcsin}\left(\sqrt{n_4^2 - n_5^2}\right) \simeq 9.8°.$$

The reflectors are positioned with an angle β such that:

$$\beta < \frac{\pi}{2} - \alpha_c - \text{Arcsin}\left(\frac{n_2}{n_e}\right) \simeq 90° - 9.8° - \text{Arcsin}\left(\frac{1}{1.4755}\right) \simeq 37.5°.$$

It is e.g. possible to adopt β=30°.

Figure 8A:
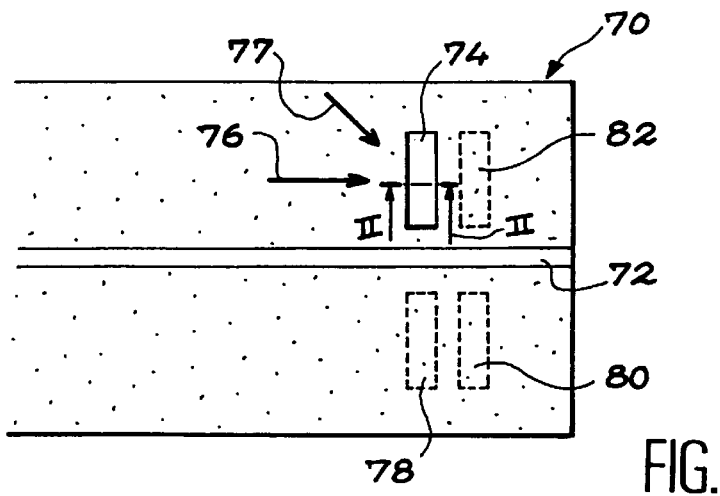
FIGS. 8A and 8B Another embodiment of the invention.
Figure 8B:
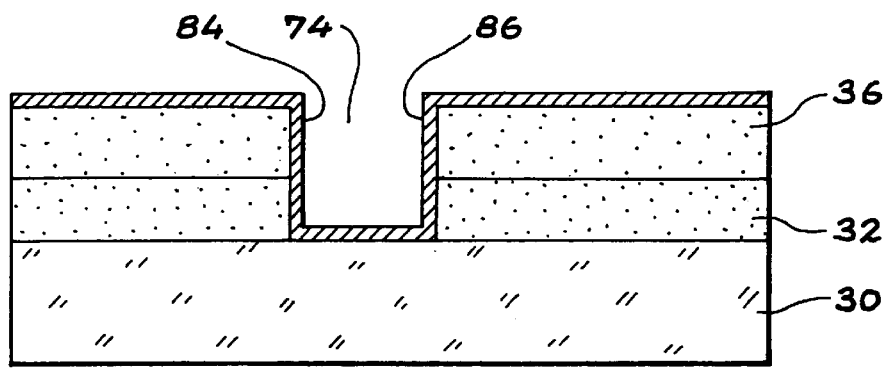

Another embodiment of the invention will now be described in conjunction with FIGS. 8A and 8B. FIG. 8A shows an integrated optical device 70 having a microguide 72. A reflector element 74 etched in the layers surrounding the microguide 72 makes it possible to filter the stray light propagating in a direction 76. A second reflector 78 can be provided on the other side of the guide 72. In order to increase filtering efficiency, supplementary reflectors 82, 80 can be arranged "in series" with the reflectors 74. 78. Thus, these reflectors are positioned behind the first reflectors 74, 78 in a direction parallel to the direction of the microguide 72.

Advantageously, a reflecting layer is deposited on one or several of the faces of one or several reflectors 74, 78, 80, 82. FIG. 8B is a sectional view II—II of the reflector 74 of the integrated optical structure 70. In accordance with what was stated in connection with FIG. 2, the latter has a substrate 30 on which are successively deposited a lower guide layer 32, a guide layer (not shown because etched in the section II—II of FIG. 8B) and an upper guide layer 36. A reflecting deposit 84 is made on the input face of the component 74, which in this example is etched in the two layers 32, 36. A second reflecting layer 86 can also be deposited on the output face of the component 74. The stray light propagation direction in the guide layer 34 is indicated by the arrow 88. The reflection coefficient on the layers 84, 86 is dependent on the nature of the deposited reflecting layer and its thickness. Such a layer can be of gold, chromium, platinum, aluminium, silver, copper or an alloy of these elements. It can also be a dielectric material layer. Such a layer can be deposited by vacuum evaporation or sputtering.

The reflector elements 74, 78, 80, 82 shown in FIG. 8A are arranged substantially perpendicular to the axis of the microguide 72. Such an embodiment is of interest when the angle $\alpha_C$ is very large. However, it is clear that within the scope of the present invention, the reflector elements can have any other possible inclination with respect to the axis of the microguide 72.

In the case where a reflecting layer 84 is positioned at the input of the reflector 74, any stray beam having a random direction 77 (FIG. 8A) with respect to the direction of the mciroguide 72 is stopped by the reflector 74. It is then possible to place at the output of the microguide 72 a means for collecting the signal having a large acceptance angle $\alpha_C$.

Figure 9:
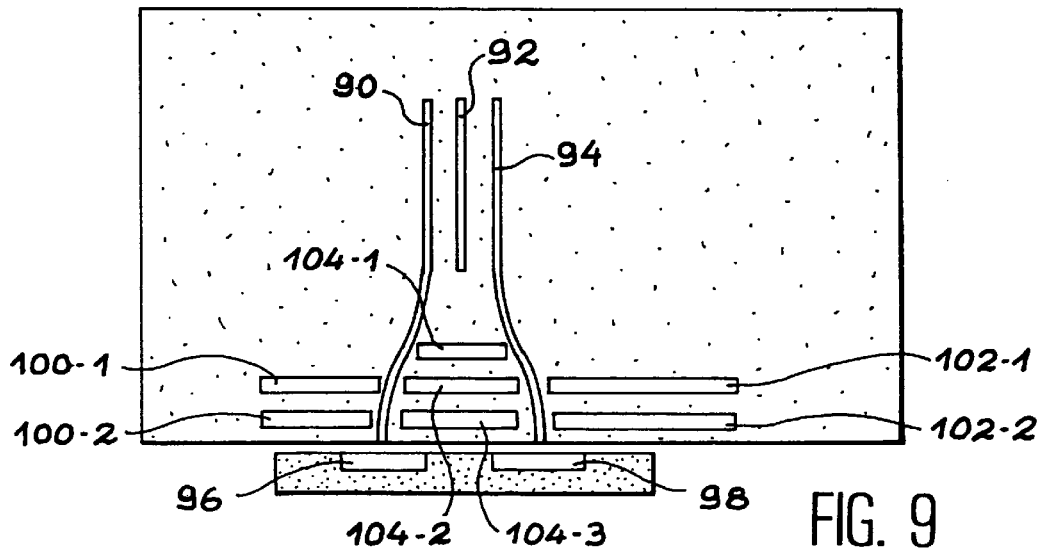
FIG. 9 A tricoupler output provided with reflectors according to the second embodiment of the invention.

An application example of the second embodiment of the invention will be given in conjunction with a tricoupler, as described in FR-A-2 686 411. The output of a tricoupler is shown in plan view in FIG. 9. It essentially has three microguides 90, 92, 94 having the geometrical characteristics and spacing described in FR-A-2 686 411. At the output, each microguide 90, 94 is directed towards a photodetector 96, 98. On each of the sides of the tricoupler are provided two reflectors 100-1, 100-2, 102-1, 102-2. Between the ends of the two microguides 90, 94 and in the extension of the central microguide 92 are also provided three reflectors 104-1, 104-2, 104-3. A 2 μm thick metallic aluminium deposit is made on each of the reflectors. The fact of successively positioning several reflectors obviates any defect of one of the reflectors used. These reflectors more particularly eliminate the stray light from the central microguide 92 of the tricoupler, which is not interesting for the signal to be detected, and advantageously replaces the absorber described in the aforementioned document for eliminating the light from the central channel of the tricoupler.

No matter which embodiment is adopted, the reflectors according to the invention can be produced by etching the integrated optical structure using any known procedure. An example is anisotropic etching (reactive ionic etching, e.g. using $CHF_3+O_2$) of the substrate constituted by the layers 32, 34, 36 of index no, $n_1$, $n'_1$.

What is claimed is:

1. An integrated optical device, comprising:
   an optical microguide of index $n_0$ between two layers of respective refractive indices $n_1$ and $n'_1$, such that $n_1<n_0$ and $n'_1<n_0$, said optical microguide having an optical path carrying an optical signal, and
   a filtering device configured to filter stray light which propagates in the vicinity of the optical microguide, in the plane of said layers, said filtering device comprising at least one reflector element placed outside said optical path on at least one side of the optical microguide, said at least one reflector element having a surface inclined with respect to said optical path and oriented to reflect stray light away from said optical axis, said at least one reflector element having at least one element etched in the layers of index $n_1$ and/or $n'_1$ and/or $n_0$.

2. Integrated optical device according to claim 1 having reflector elements on the opposite sides of the microguide.

3. Integrated optical device according to one of the claim 1 or 2 at least one face of a reflector element being covered with a reflecting layer.

4. Integrated optical device according to claim 3, the reflecting layer being of a material incorporating gold or chromium or aluminium or platinum or silver or copper or a dielectric material.

5. Integrated optical device according to claim 1, the device having at least two reflector elements positioned successively.

6. Integrated optical device according to claim 1, the reflector elements being oriented perpendicular to said microguide axis.

7. Integrated optical device according to claim 1, also having a light collection element with an acceptance angle $\alpha_C$, the reflector element being inclined with respect to said microguide axis by an angle, $$\beta < \frac{\pi}{2} - \alpha_c - \text{Arcsin}\left(\frac{n_3}{n_2}\right)$$

in which $n_3$ is the index of the reflector element and where $n_2$ is the effective index of the structure surrounding the microguide.

8. Device according to claim 7, the collection element being an optical fibre having a core of index $n_4$ and a cladding of index $n_5$, with $$\alpha_c = \text{Arcsin}\left(\sqrt{n_4^2 - n_5^2}\right).$$

9. Device according to one of the claims 7 to 8, the reflector element containing air.

10. An integrated optical device, comprising:

an optical microguide of index $n_0$ between two layers of respective refractive indices $n_1$ and $n'_1$, such that $n_1<n_0$ and $n'_1<n_0$, said optical microguide having an optical path carrying an optical signal; and a filtering device configured to filter stray light which propagates in the vicinity of the optical microguide, in the plane of said layers, said filtering device comprising at least one reflector element placed outside said optical path on at least one side of the optical microguide, said at least one reflector element having at least one element etched in the layers of index $n_1$ and/or $n'_1$ and/or $n_0$, wherein at least one face of said at least one reflector element is covered with a reflecting layer.

11. An integrated optical device according to claim 10, wherein the reflecting layer comprises a material selected from the group consisting of gold, chromium, aluminum, platinum, silver, copper, and a dielectric material.

12. An integrated optical device according to claim 10, wherein the filtering device has at least two reflector elements positioned successively.

13. An integrated optical device according to claim 10, wherein said at least one reflector element is oriented perpendicular to the optical microguide direction.

* * * * *